United States Patent
Wee et al.

(10) Patent No.: US 6,518,540 B1
(45) Date of Patent: Feb. 11, 2003

(54) METHOD AND APPARATUS FOR PROVIDING ABLATION-FREE LASER MARKING ON HARD DISK MEDIA

(75) Inventors: Teng Soon Wee, Singapore (SG); Lian Boon Koh, Singapore (SG); Daming Liu, Singapore (GB); Yuan Yuan, Singapore (SG); Yong Feng Lu, Singapore (SG); Jui Kiat Goh, Singapore (SG); Kuan Teck Chang, Singapore (SG)

(73) Assignee: Data Storage Institute, Singapore (SG)

( * ) Notice: Subject to any disclaimer, the term of this patent is extended or adjusted under 35 U.S.C. 154(b) by 0 days.

(21) Appl. No.: 09/332,756

(22) Filed: Jun. 14, 1999

Related U.S. Application Data

(60) Provisional application No. 60/089,411, filed on Jun. 16, 1998, provisional application No. 60/089,465, filed on Jun. 16, 1998, and provisional application No. 60/089,429, filed on Jun. 16, 1998.

(51) Int. Cl.$^7$ ................................................. B23K 26/18
(52) U.S. Cl. ............................ 219/121.61; 219/121.68; 219/121.78
(58) Field of Search ....................... 219/121.61, 121.67, 219/121.62, 121.82, 121.69, 121.75, 121.68, 121.83; 360/135; 700/166

(56) References Cited

U.S. PATENT DOCUMENTS

| 4,131,782 A | * 12/1978 | Einstein et al. |
| 4,335,939 A | 6/1982 | Stovell et al. |
| 4,547,651 A | 10/1985 | Maruyama |
| 4,636,043 A | * 1/1987 | Bellar |
| 4,908,493 A | 3/1990 | Susemihl |
| 5,057,664 A | 10/1991 | Johnson et al. |
| 5,298,718 A | 3/1994 | Masuda |
| 6,037,565 A | 3/2000 | Hackel et al. |
| 6,049,056 A | 4/2000 | Balamane et al. |
| 6,057,525 A | 5/2000 | Chang et al. |
| 6,059,555 A | 5/2000 | Barenboim et al. |
| 6,091,047 A | 7/2000 | Miyakawa et al. |
| 6,130,402 A | 10/2000 | Abella et al. |
| 6,163,010 A | 12/2000 | Kobsa |

FOREIGN PATENT DOCUMENTS

FR          2772910          6/1999

* cited by examiner

Primary Examiner—M. Alexandra Elve
Assistant Examiner—Jonathan Johnson
(74) Attorney, Agent, or Firm—Chein-Wei Chou; John B. Sowell

(57) ABSTRACT

A method and apparatus for creating ablation-free visible markings on a multi-layer hard disk magnetic storage media by laser-induced deformation while maintaining the integrity of the protective carbon layer, and without destroying the multi-layered structure of the media. The apparatus includes a laser generator, a rotatable optical plate and a beamsplitter by which the fluence of the beam can be controlled without altering the power setting to the laser generator, a beam sampler for determining the fluence of the beam, and an optical plate which acts with the beamsplitter to eliminate unwanted reflection of the laser beam. The laser beam is steered by a beamsteerer to a hard disk held in a material handling unit. This technique is highly suitable for marking or labeling finished hard disks for the purposes of identification and traceability, without creating any short-term or long-term contamination problems. The corresponding storage media so marked are also claimed.

19 Claims, 14 Drawing Sheets

METHOD AND APPARATUS FOR PROVIDING ABLATION-FREE LASER MARKING ON HARD DISK MEDIA

CROSS REFERENCE TO RELATED APPLICATIONS

Reference is made to and priority claimed from provisional application serial No. 60/089,411 titled "Laser Induced Deformation on Hard Disk Surface," provisional application ser. No. 60/089,465 titled "Laser Marking on Finished Hard Disk Media," and provisional application serial No. 60/089,429, titled "Laser Marking on Multi-Layered Hard Disk Media," all filed on Jun. 16, 1998.

BACKGROUND OF THE INVENTION

1. Field of the Invention

This invention relates generally to laser marking system, and in particular, to a laser marking apparatus and method for marking the surface of a workpiece with a laser beam.

2. Description of the Prior Art

In recent years, the use of lasers in hard disk surface processing is gaining popularity. Laser pulses have already been successfully used to create landing zones with improved tribology performance for the data transducing heads. Lasers have also been identified as a viable tool for the marking or labeling of hard disk surfaces. There are several occasions where disks need to be individually labeled. For example, a hard disk may contain markings indicating the number of reworks it has undergone, to assist the drive manufacturers in determining if a particular disk is suitable for further rework. Marking on an individual disk not only helps to classify the disk but also allows the drive and media manufacturers to identify the product type and trace the origin of the disk should mixing occur. The media manufacturers can more easily and reliably trace faults that result in disk failure if relevant information is tagged to individual disks.

Currently, there are a few methods of marking the finished disks. Some users mark on the disk surface using a scriber. The scriber actually cuts into the delicate disk surface, abrading and damaging the top layers of the disk. Alternatively, disk marking can be carried out using some forms of ink. Ink marking may use either a jet of the liquid ink or simply a pen with a felt tip to transfer the inscription onto the disk surface. However, ink films can deteriorate with time and give rise to contamination. A disk marking method that is both non-contaminating and non-damaging is needed. The marking method also needs to be fast and efficient in order to be adopted by the manufacturing industry.

SUMMARY OF THE INVENTION

It is therefore an object of the invention to provide an apparatus which uses a laser to produce visible deformations on the surface of a workpiece, especially a hard disk magnetic storage media workpiece.

It is another object of the invention to provide a method and apparatus for speedily and precisely marking hard disk magnetic storage media with a laser in a way such that surface deformation is visible, yet the protective carbon layer of the disk is intact and free of ablation.

It is yet another object of the invention to provide a method and laser apparatus for inducing surface deformation for the marking process without introducing contamination to the disk surface.

According to one aspect of the present invention, there is provided a laser beam generator, a beam conditioning module comprising a rotatable optical plate and a beamsplitter, a beam monitoring module, a beam steering module, and a materials handling unit to handle workpieces being marked. A beam from the laser generator is passed through a rotatable optical plate and a beamsplitter in the beam conditioning module, and a sample of the beam is passed to a beam monitoring module where the fluence of the beam is determined, and if desired, the rotatable optical plate can be rotated to vary the fluence of the conditioned beam leaving the beam conditioning module. The conditioned beam is passed to a beam steering module, which directs the beam to the surface of a workpiece held by the materials handling unit.

An advantage of the present invention is that a workpiece such as magnetic storage media can be marked using a laser without ablation of the protective carbon layer, and thus no additional cleaning or processing step is required before the storage media is used.

Another advantage of the present invention is that the fluence of a laser marking beam can be adjusted without changing the power setting of the laser itself.

A further advantage of the present invention is that flashback of the laser beam from the workpiece or beam-steerer is prevented.

IN THE DRAWINGS

For a more complete understanding of the invention, reference is now made to the detailed description of the embodiments as illustrated in the accompanying drawings, wherein.

Figure 9:
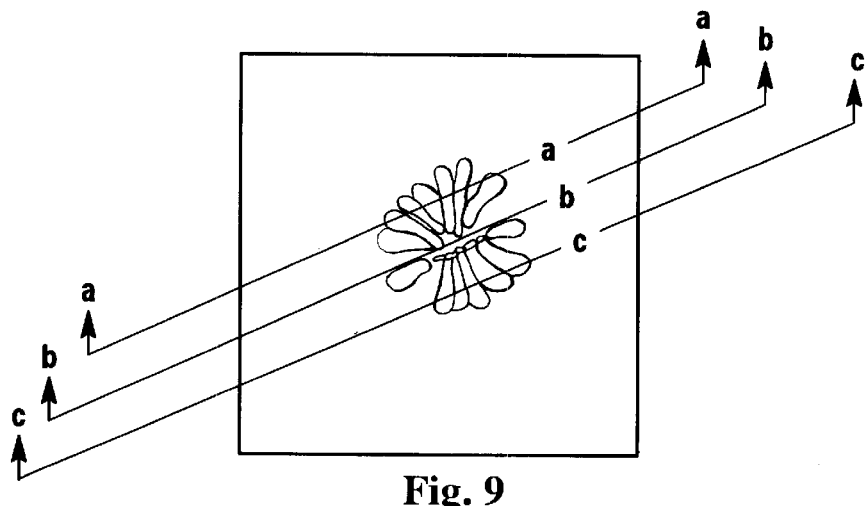
FIGS. 9a, 9b and 9c are data profile plots corresponding to cross-sections of an atomic force microscopy image of the ripple structure shown in FIG. 9 formed during laser marking according to the present invention.
Figure 10:
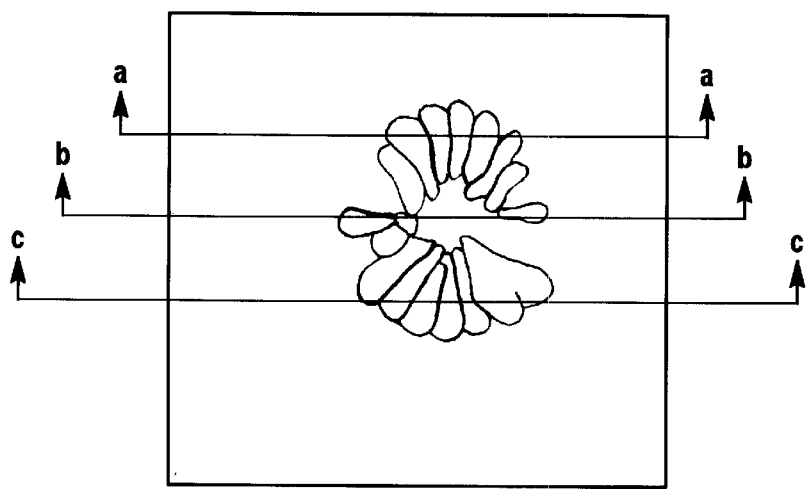
Figure 10A:
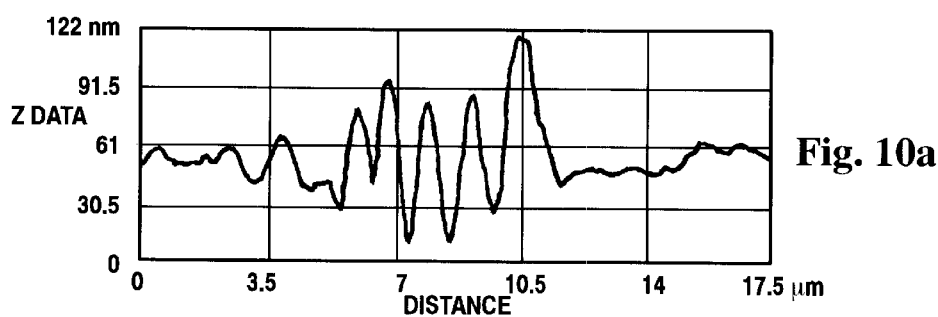
Figure 10B:
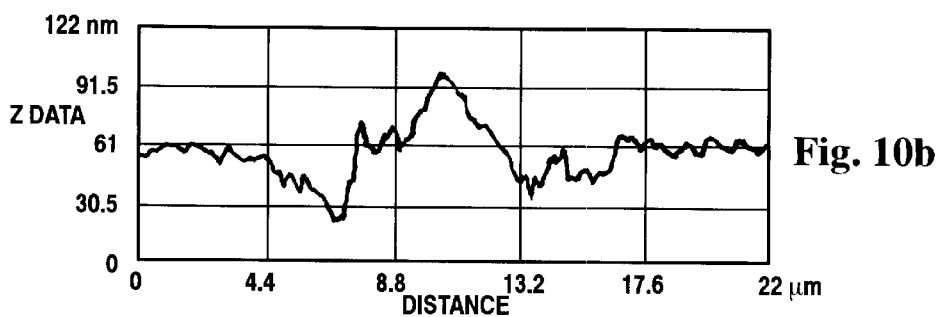
Figure 10C:
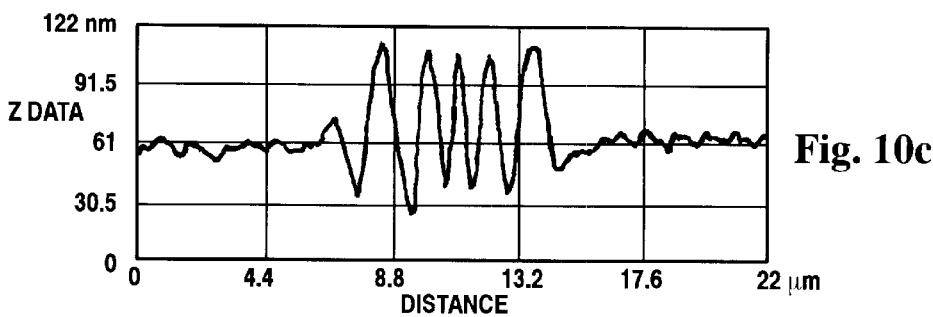
Figure 11A:
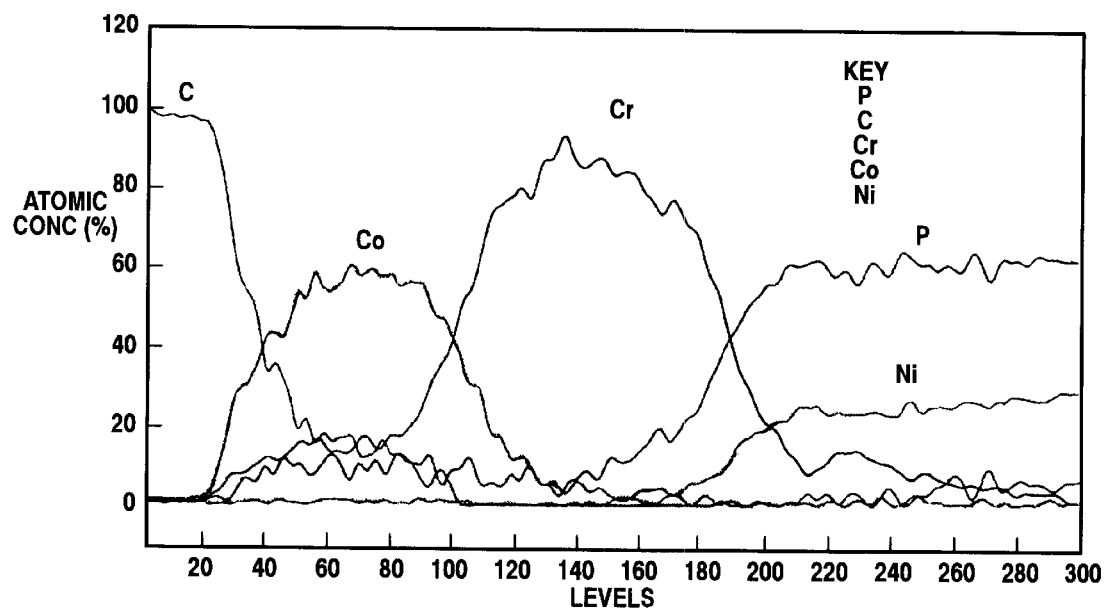
Figure 11B:
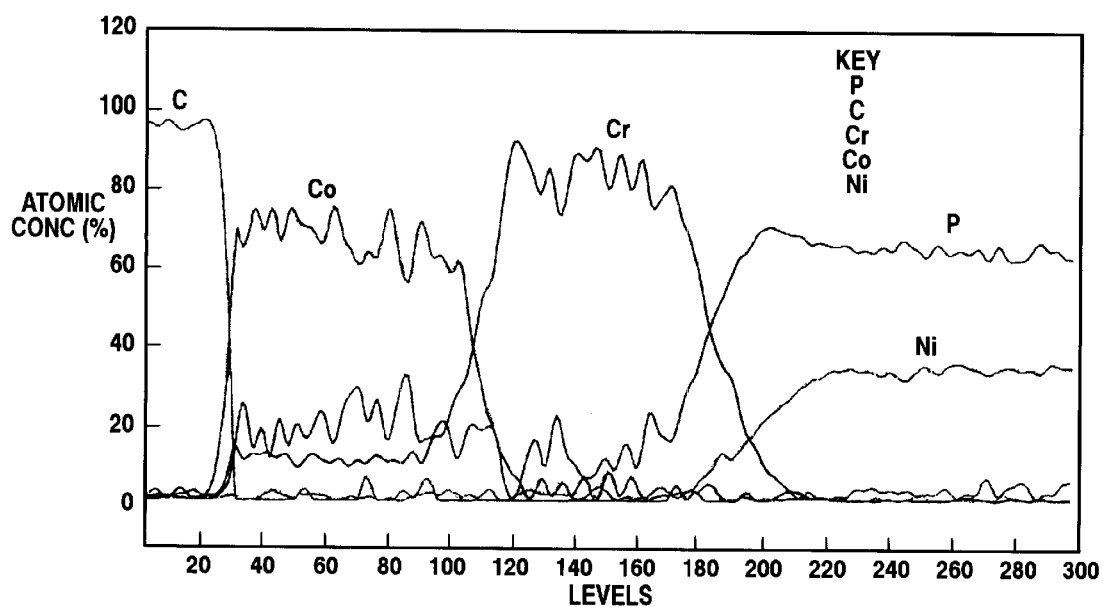
Figure 12:
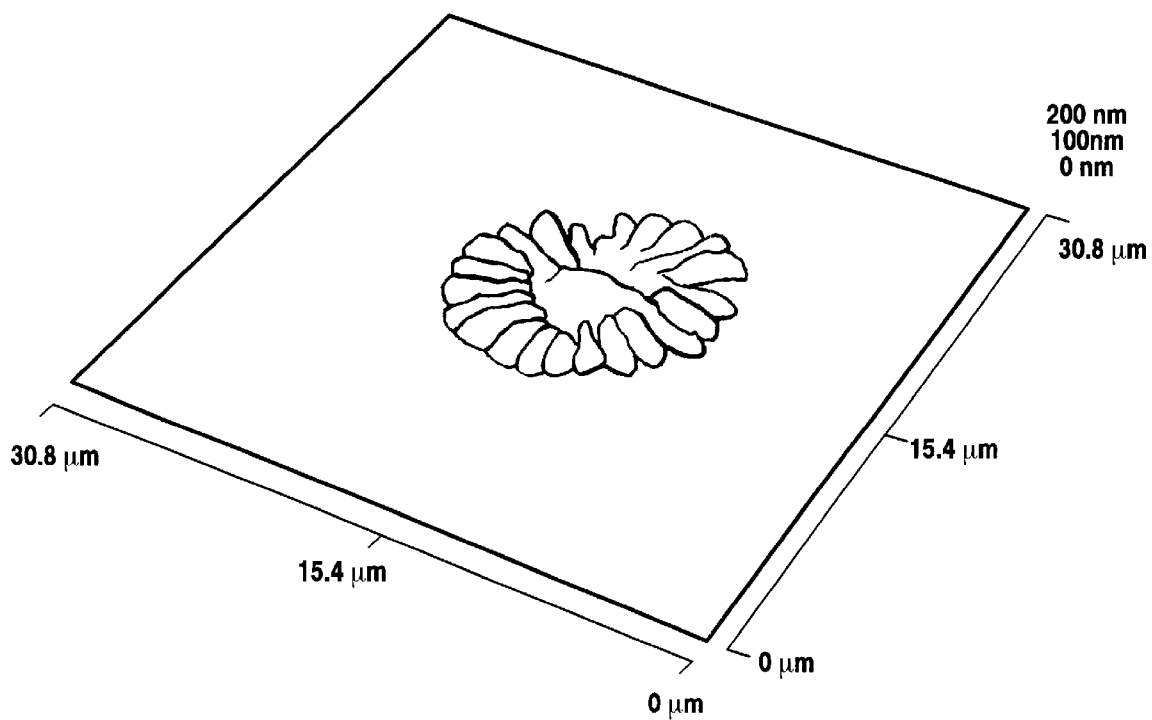
Figure 13:
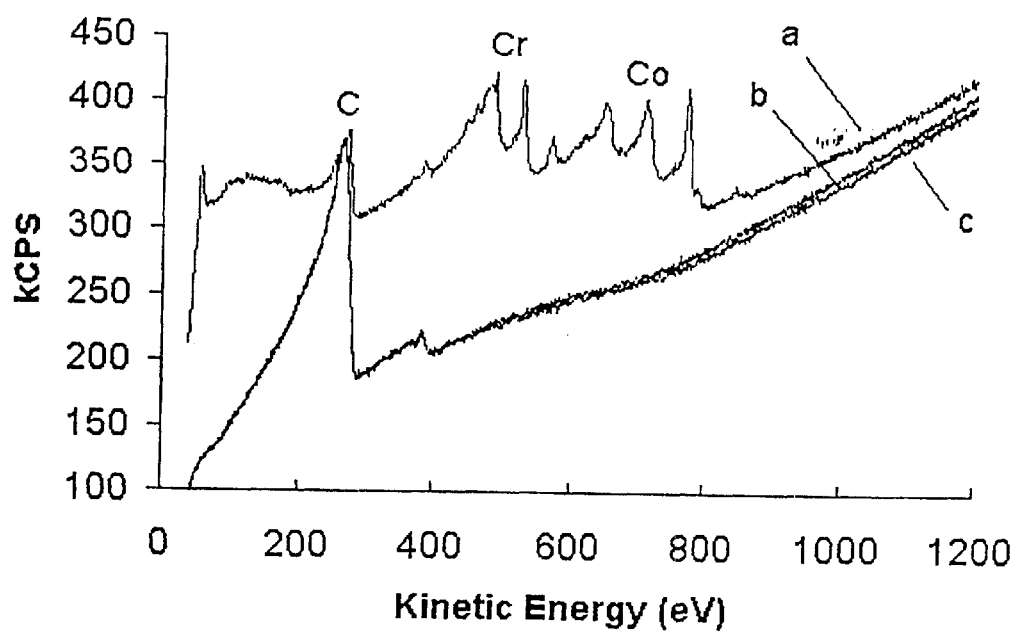
Figure 14:
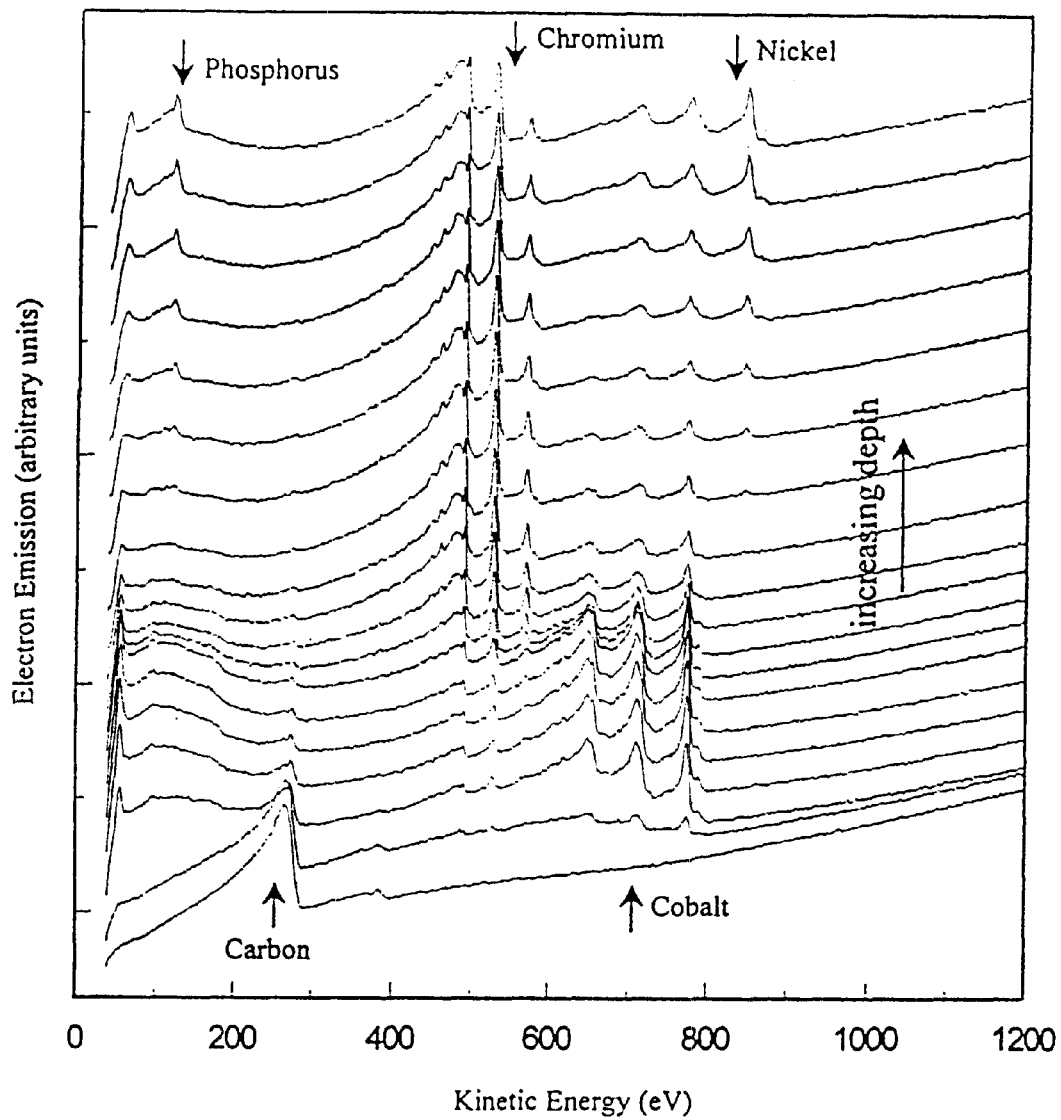

FIGS. 10a, 10b, and 10c are data profile plots corresponding to cross-sections of an atomic force microscopy image of the ripple structure shown in FIG. 10 formed during laser marking using a laser fluence above that of the present invention;

FIG. 11a is an auger electron spectroscopy depth profiling performed on the ripple structure of FIG. 9, and FIG. 11b is an auger electron spectroscopy depth profiling performed on a non-irradiated region on the same disk specimen;

FIG. 12 is an atomic force microscopy image of a mark made on a hard disk using a fluence above the range of the present invention;

FIG. 13 are data plots showing the results of auger electron spectroscopy performed on the surface of FIG. 12 at three locations, namely a—the center of the ripple structure, b—the rippling region and c—a non-irradiated region; and FIG. 14 illustrates auger electron spectroscopy data profiles of scans performed at various depths of the central portion of the ripple structure of FIG. 9 showing that the surface carbon layer remains intact.

Figure 15:
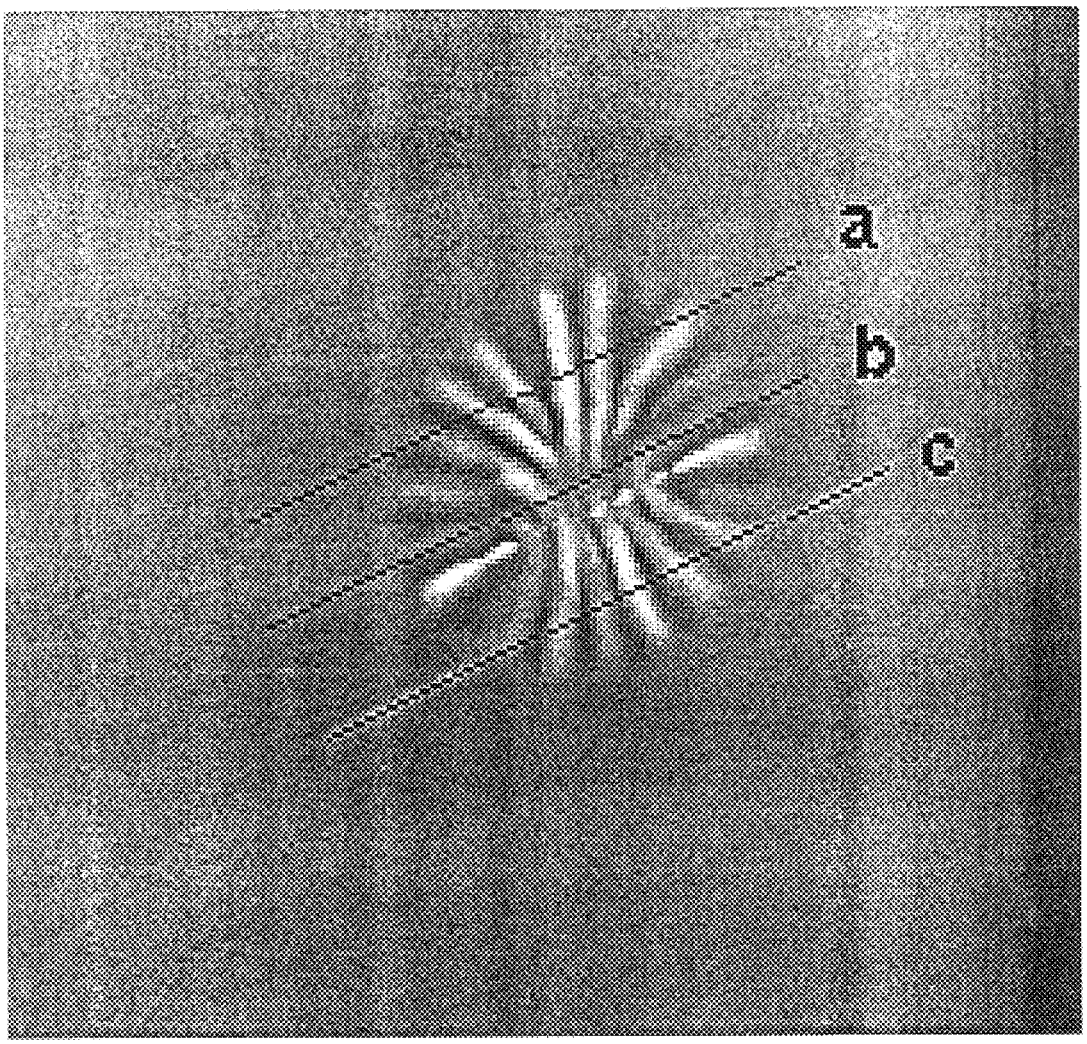

FIG. 15 is an enlarged version of FIG. 9.

DETAILED DESCRIPTION OF THE PREFERRED EMBODIMENTS

A laser marking process performed on hard disks can produce two kinds of surface deformation. Commonly, the process results in severe melting and inter-diffusion of the upper metallic layers. As the protective carbon layer has also been melted, the interdiffusion between the layers can lead to possible reliability problems due to contamination of the surface layer by the underlying layers. On the other hand, with suitably low laser fluence, the marking process can bring about the necessary visible surface rippling without destroying the carbon layer. The desired fluence can be achieved by attenuating the laser beam using a rotatable optical plate and an optical device. The foregoing and other objects, features and advantages of the invention will be apparent from the following detailed description of the preferred embodiments of invention, which makes reference to the several Figs. of the drawing.

Description of the Laser-Marking System

Figure 1:
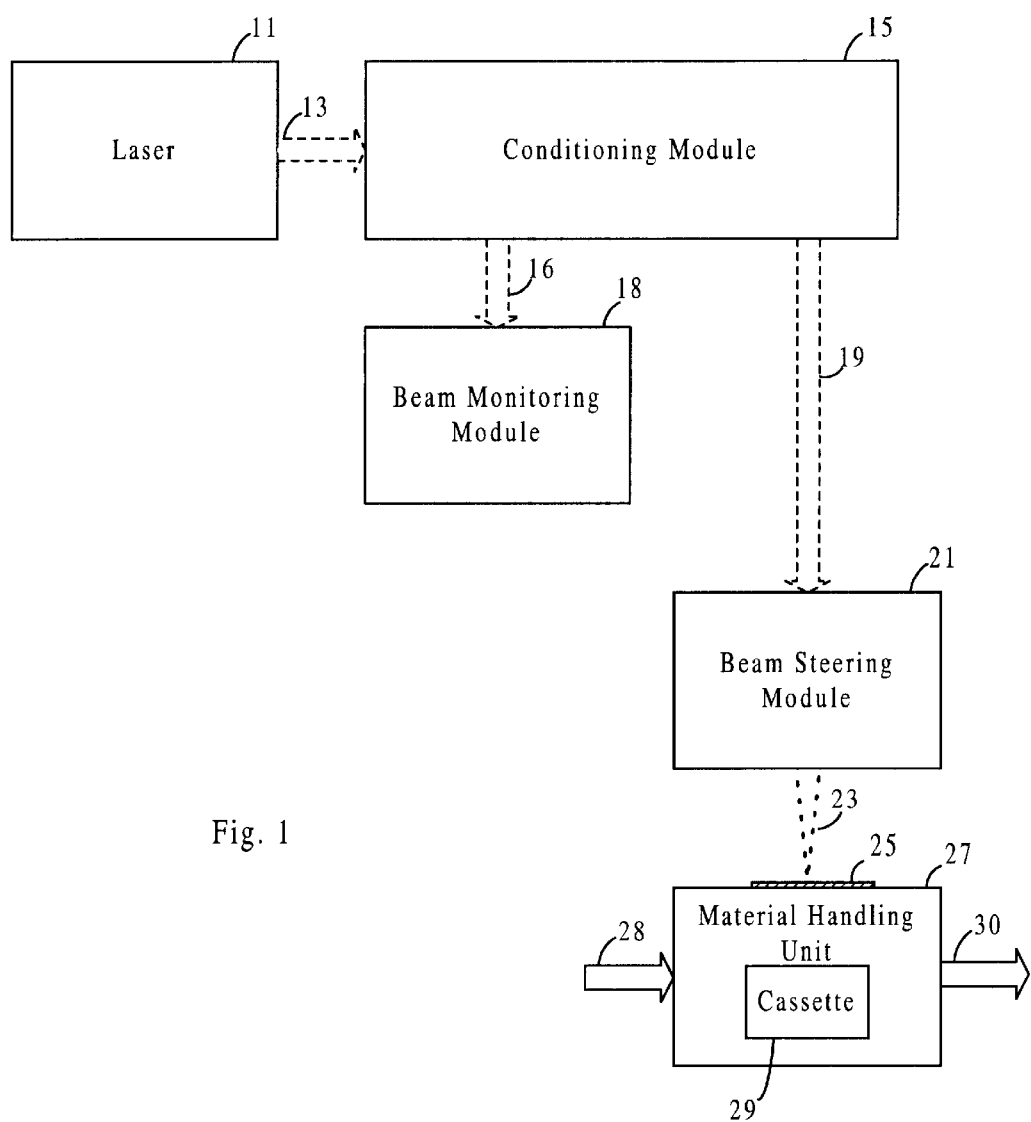
FIG. 1 is a block diagram of the laser marking apparatus.

FIG. 1 is a block diagram of the apparatus of the preferred embodiment used for marking the workpieces. A suitable laser generator 11 is employed to create an output laser beam having a unitary frequency, phase and direction. Output beam 13 from laser generator 11 is passed to a beam conditioning module 15 in which a number of operations including sizing and attenuation are performed to the beam, such that the beam is of the right quality to be delivered to the workpiece 25. If desired, a sample 16 can be taken of beam 13, said sample being passed to a beam monitoring module 18.

The beam output 19 from the beam conditioning module 15 is passed to a beam steerer 21 in which the position of the beam is manipulated to produce a beam that is directed and focused onto the surface of a workpiece to be marked. In a preferred embodiment, the beam steerer 21 comprises a galvanometer capable of directing and focusing the output beam 23 onto the workpiece 25 which is held at a predetermined position with respect to the beam steerer 21. Such a position is within the range of focus for the output beam 23, such that the beam can be scanned across a portion of the surface of the workpiece 25 and the desired mark or pattern of marks created on the surface. Material handling unit 27 comprises an input section 28 by which each caddie or cassette 29 holding one or more workpieces enters and is placed in a suitable position for being marked by the output beam 23, and after the marking operation is carried out, the caddie or cassette 29 holding one or more marked workpieces 25 is removed to output section 30, while the next caddie or cassette of one or more unmarked workpieces is positioned at the predetermined position for marking. In an alternative embodiment, the position of output beam 23 can be fixed at a predetermined location within the range of motion of a movable materials handling unit, such as a translating X-Y stage, and the workpiece and materials handling stage can be moved with respect to the fixed position of the output beam 23, thus creating marks or a pattern of marks on the surface of workpiece 25.

Figure 2A:
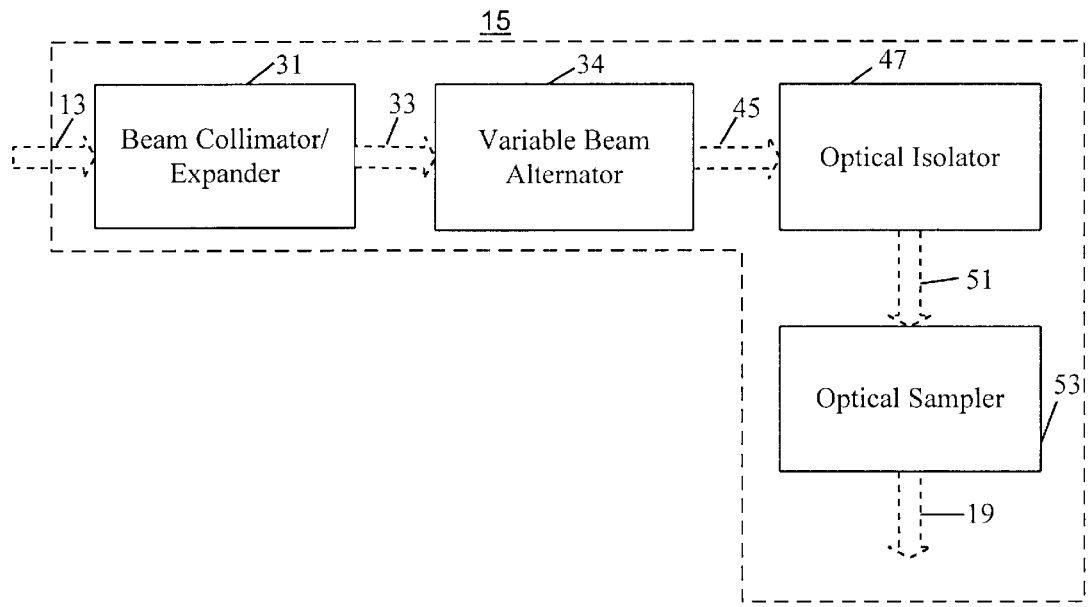
FIG. 2a is a more detailed block diagram of the beam conditioning module of the laser marking apparatus.

FIG. 2a is a more detailed block diagram of the beam conditioning module 15. In FIG. 2a, linearly polarized beam 13 passes to beam expander and collimator 31, in which some of the properties of the beam are altered to produce an expanded beam 33. The expanded beam passes to a variable beam attenuator 34 by which the fluence of the marking beam striking the workpiece can be altered to a desired level. The variable attenuation of the output beam 33 can be achieved using a rotatable optical plate, preferably half-wave plate, and optical polarizer arrangement. A optical polarizer allows only a beam that is linearly polarized along a certain direction to pass through. By rotating the optical plate, through which the linearly polarized beam passes, about the plate's symmetry axis in a plane perpendicular to the laser beam, the direction of polarization of the beam is rotated and the component of the beam 45 that can eventually pass through the fixed polarizer is therefore varied, bringing about a variable attenuation to the beam 33.

In an alternative embodiment, variable beam attenuation can also be achieved simply by placing a rotatable polarizer in the path of the linearly polarized beam 33. As the polarizer is rotated about its symmetry axis in a plane perpendicular to the beam 33, the component of the beam that is allowed to pass through the polarizer is also changed, leading to variable power of the output beam 45.

Output beam 45 passes to an optical isolator 47, such as a quarter wave plate, which serves to prevent reflection of the beam from the workpiece from reaching the laser generator. From optical isolator 47, the resulting beam 51 passes to an optical sampler 53 that provides a sample beam from which a responsive reading may be obtained. Main beam 19 passes from the optical sampler to the beam steering module 21 (shown in FIG. 1).

Figure 2B:
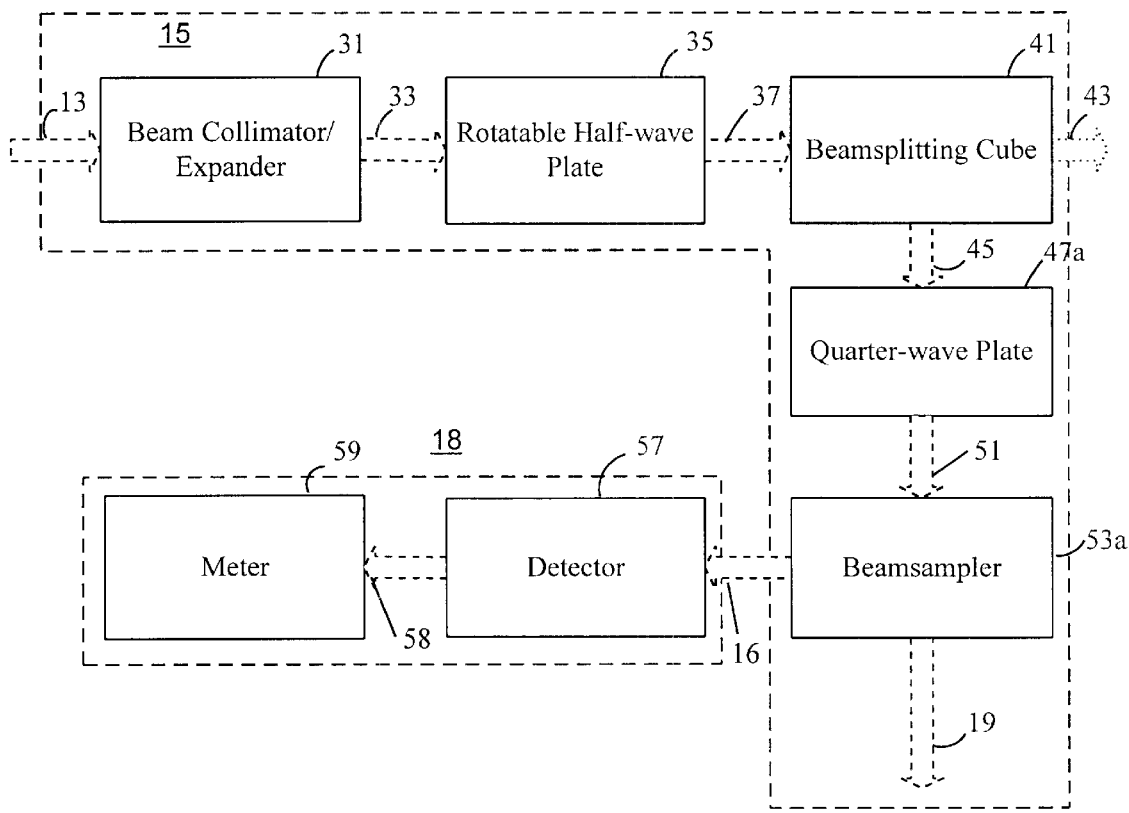
FIG. 2b is a preferred embodiment of the beam conditioning module.

FIG. 2b shows a preferred embodiment of the beam conditioning module. Linearly polarized beam 13 from the laser passes to a beam collimator and expander 31, in which some of the properties of the beam are altered to produce an expanded beam 33. The expanded laser beam 33 passes to a rotatable half-wave retardation plate 35, located in the path of beam 33 and oriented such that the plate can be annularly rotated about its symmetry axis in a plane perpendicular to the laser beam. In passing through the rotatable optical plate 35, the direction of the plane of polarization of the beam is rotated to an extended depending upon the initial orientation of the incident beam 33 and the degree of rotation of the plate 35 around its axis, thus producing a polarization-shifted output beam 37. Output beam 37 leaving the rotatable optical plate 35 passes to a beamsplitting cube 41. The beamsplitting cube 41 splits the incoming beam into a plurality of output beams, commonly two components or beams, a p component beam 43 passes straight through the cube, while the s component beam 45 is redirected such that it exits the beamsplitter cube 41 at a 90 degree angle from the incident beam. Depending on the orientation of rotatable optical plate, the energy of the beam 37 entering the beamsplitter cube 41 can be split from about 97% p and 2% s to about 2% p and 97% s.

In this embodiment, the intensity or fluence of the output beam 23 striking the workpiece 25 can be adjusted by rotating optical plate 35 on an axis parallel to beam 33 until the desired attenuation of the output beam striking the workpiece 25 is achieved. The rotatable optical plate 35 can be rotated either manually, or by a motor responsive to a signal generated by a processor.

The beam 45 leaving beamsplitting cube 41 may be directed to a beam monitor, to a beam steering module, or, preferably, through an optical isolator before passing to the beam monitoring and the beam steering modules. The optical isolator serves as a feedback preventer by optically isolating the laser generator 11 from unwanted reflection from further down the path of the beam. In a preferred embodiment, a quarter-wave retardation plate 47a is used in conjunction with the beamsplitting cube 41 for the purpose of optical isolation. The quarter-wave plate 47a is oriented such that plane-polarized incident beam becomes circularly polarized upon leaving the plate. Optical isolation occurs because a linearly polarized input beam from beamsplitter 41 is transformed by the optical plate into a circularly polarized output beam 51. Any portion of beam 51 reflected from the beam steerer 21 or the workpiece 25 is changed as it passes back through the quarter wave plate 47a, to a polarization orthogonal to the polarization of the beam 45 entering the optical plate. When the reflected beam passes back into the beamsplitting cube 41, the reflected beam will pass straight through the beamsplitting cube 41 and exit the beamsplitting cube from a different face than the one facing the laser generator 11. Thus, positioning quarter wave plate 47a along the path of the beam between the beam steerer 21 and the beamsplitting cube 41 will optically isolate the laser generator and prevent flashback from the workpiece 25 or the beam steerer 21 to the laser generator 11.

Beam 51 exiting the quarter wave plate 47a passes to a beamsampler 53a, which deflects sample 16 of beam 51 to a detector 57. Detector 57 produces a signal 58 responsive to the fluence of beam 51, and signal 58 is input to a meter 59 having a display responsive to the strength of beam 51. Upon leaving beamsampler 53a, the main body of the conditioned beam 19 passes to the beam steering module 21 as shown in FIG. 1.

Figure 3:
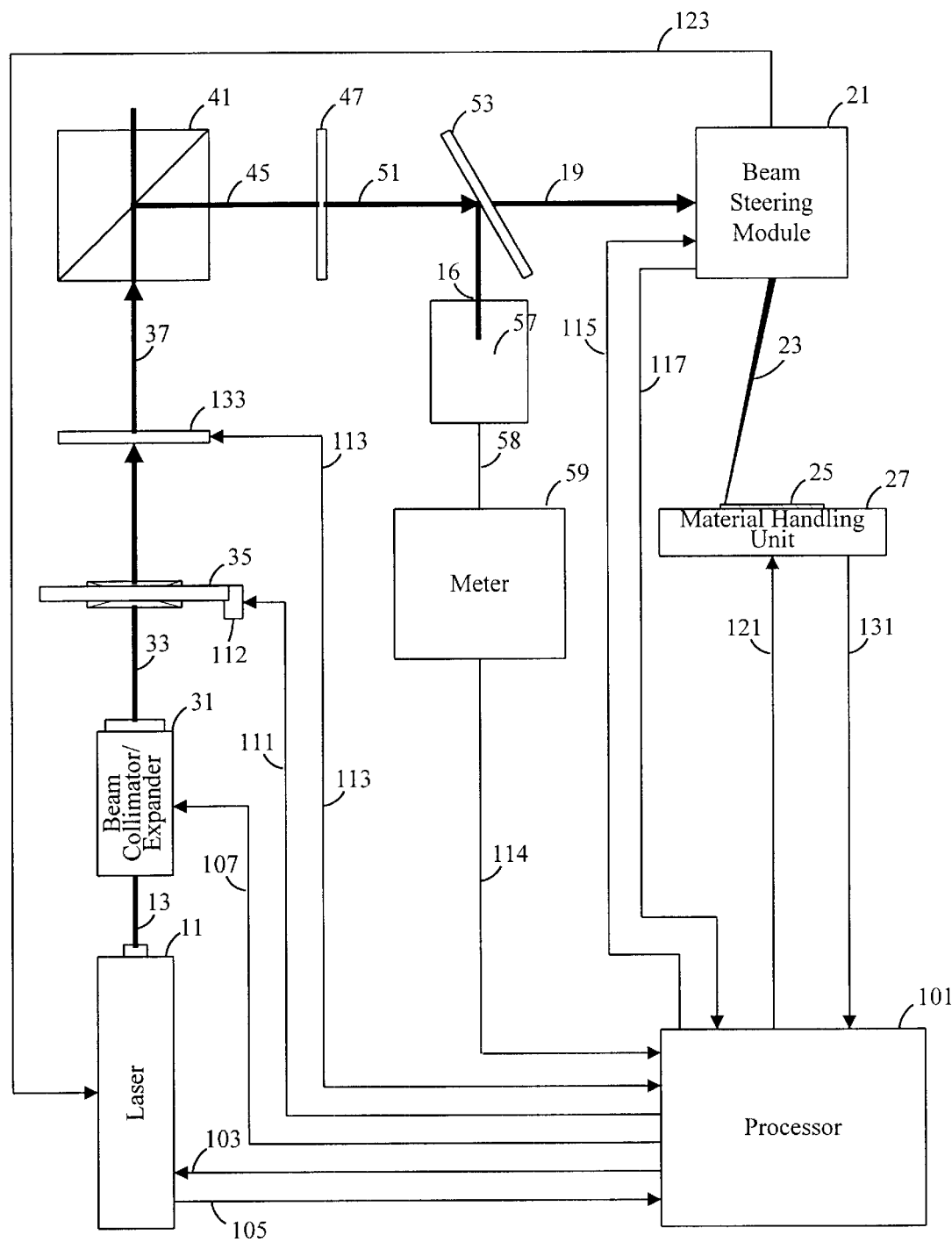
FIG. 3 is a more detailed diagram of the laser marking apparatus incorporating a processor.

As shown in FIG. 3, a further preferred embodiment of the present invention is the use of a processor 101 to control and synchronize various components of the apparatus and facilitate the method for producing marked workpieces using the present apparatus. The processor contains memory, a CPU, a display and an input device such as a keyboard through which the user can interact with the processor, and is capable of receiving one or more signals responsive to the condition of the status of said laser generator, the pattern of marks to be placed on said workpiece, the direction of said selected beam leaving said beam steerer, and the position of the workpiece relative to the beam steerer, as well as being capable of generating one or more signals affecting at least one of the status of said laser generator, the desired pattern of marks to be made on the surface of said workpiece, the direction of the beam leaving the beam steerer, and the position of the workpiece to be marked. The processor 101 communicates with laser 11 through signal 103 by which the processor sets various parameters of the laser, such as frequency of laser pulses and laser power. Processor 101 receives signal 105 responsive to the status of the laser, e.g., Q-switch frequency and power level. The processor can send signal 107 to vary the setting of the beam expander 31, and thus vary the size of the beam. Processor 101 can also send a signal 111 to a motor 112 capable of rotating rotatable optical plate 35 along its axis and thus alter the intensity or fluence of the output beam 23 reaching the workpiece 25.

Shutter 133 can send a bidirectional signal 113 to processor 101 to indicate whether the shutter is in an open or closed status, and processor 101 can in response signal the shutter 133 to maintain or change the status. The processor can receive signal 114 from meter 59 responsive to the power of the sampled beam, and can subsequently issue a command to rotate rotatable optical plate 35 along its axis if the desired fluence or intensity of the output beam 23 reaching the workpiece is not within the desired range or at pre-established setpoint.

The processor 101 is also capable of receiving input from the user on the pattern of markings to be made on the surface of the workpiece 25, and converting the pattern to a digital representation, which the processor can then transmits to the beam steerer 21 by means of signal 115. Using signal 115, the processor can control the position of output beam 23 striking the surface of the workpiece 25, so as to create a predetermined marking pattern on the surface of the workpiece 25.

Signal 117 is generated by beam steerer 21 and sent to the processor 101 responsive to the position of the output beam 23 on the workpiece 25. Signal 131 is generated by the materials handling unit 27 responsive to the position of the workpiece 25 and sent to the processor 101, while signal 121 is generated by the processor 101 and sent to the materials handling mechanism to have it change the position of the workpiece 25. If the laser 11 is operated using a Q-switch, the operation of the Q-switch may be controlled by signal 103 from processor 101 or directly controlled by a signal 123 from the beam steerer 21, bypassing any delay by the processor 101.

If the laser 11 comes equipped with an integral controller, many of these functions can be placed in the correct settings, independent of the external processor 101, by using the integral controller. Other input signals to the processor 101, such as a workpiece proximity detector, will be apparent to those skilled in the art.

The preferred method of carrying out the present invention can be described with reference to FIG. 3. A Q-switched, diode-pumped laser generator 11 operating in the Gaussian mode and with a wavelength of 1064 nanometers is employed. Use of diode laser is preferred because a diode-pumped laser is more efficient, longer lasting, more durable and has a higher-quality laser output than the use of a flashlamp pumping scheme. Use of a Q-switch scheme is advantageous because it causes pulse repetition emission with a relatively high peak pulse energy. Other types of laser generators may be used, so long as they emit a beam at a wavelength that is capable of generating sufficient heat to melt a portion of the desired layer of the workpiece. To ensure pulse-to-pulse uniformity in the marking process, the laser is made to operate in the pre-lasing mode; that is, the Q-switch is set such that between pulses, the laser generator 11 is running slightly over threshold in continuous-wave mode with a low output power. When the Q-switch is turned off, a laser pulse is built up from the already present reproducible continuous-wave pre-lasing signal instead of from a spontaneous emission in the lasing cavity when no prelasing is present. The prelasing operation ensures that the pulse-to-pulse noise is less than about 5% and preferably less than 2%.

In a preferred embodiment, the beam 13 emerging from laser generator 11 is linearly polarized, and beam 13 passes through a beam collimator and expander 31. Beam expander 31 alters the size of the beam to achieve the desired beam spot size after the beam is focused on the surface of the workpiece. This size of the spot on the surface of the workpiece determines the actual beam intensity used to mark the workpiece surface, with small spot sizes resulting in markings of high resolution. The expanded beam 33 leaving the beam expander 31 passes through a rotatable optical plate 35, which has the effect of rotating the polarizing plane of the beam, and then through shutter 133, which is employed as a safety device to block the laser beam when the laser marking apparatus is not in use. The laser generator 11, beam expander 31 and shutter 133 receive signals from and send signals to processor 101 responsive to desired or actual settings or levels of operation.

The beam 37 enters the polarizing beamsplitting cube 41 where the beam is separated into its p- and s- polarization components, which component beams emerge from different faces of the cube. Although either the p- or s- component beams could be used to mark the workpiece, in a preferred embodiment, the s- component is used. While the p- component passes linearly through the cube 41, the s- component is reflected at an angle, and exits a different face of the cube where it passes to optical plate 47. The beam 51 exiting optical plate 47 is monitored by a beam sampler 53 in which a sample 16 of the incident beam is removed and directed to detector 57 which generates a responsive signal 58 that is used to create a display on meter 59 or as an input to processor 101. The intensity of the beam 23 striking the workpiece can be varied in response to signal 58 by rotating rotatable optical plate 35 to attenuate the beam 37 to a greater or lesser degree instead of having to alter the controls of the laser power supply with the resulting undesirable beam power instability.

Laser beam 19 from the sampler 53 passes to beam steerer 21, which in a preferred embodiment is a galvanometer. The beam steering module, acting pursuant to a signal 115 from processor 101, positions and focuses beam 23 on the surface of the workpiece 25, and on receiving appropriate instructions from the processor 101, the beam steering module scans the beam across the surface of the workpiece 25 while signals sent to laser 11 initiate laser pulses at appropriate times in the marking cycle to inscribe the desired marks or pattern of marks on the surface of the workpiece 25. As the laser beam is preferably in the form of pulses, scanning the beam 23 across the surface of the workpiece 25 according to a predetermined pattern input into the processor 101 produces laser-induced dot-like marks along the path of the scan. By scanning the laser beam along closely-spaced multiple lines and controlling the points at which the pulses strike the workpiece, alphanumeric patterns can be formed on the workpiece for identification purposes. The spacing between two adjacent marks is determined by the laser Q-switch frequency and the beam scanning speed, both of which can be controlled by the processor. The spacing of the marks determines the visual contrast of the marked patterns on the surface of the workpiece.

In the materials handling unit 27, a workpiece is moved into position for being marked, preferably held in a fixed position while processor 101 signals for beam steerer 21 to vary the position of the beam striking the workpiece, so as to form the desired mark (surface deformation) or pattern of marks. Although workpieces can be handled individually, the materials handling unit typically comprises a magazine or cassette designed to hold multiple workpieces, which workpieces are individually marked. When all of the workpieces in the cassette or magazine have been marked, the magazine or cassette of marked workpieces is replaced with one containing unmarked workpieces.

Figure 4:
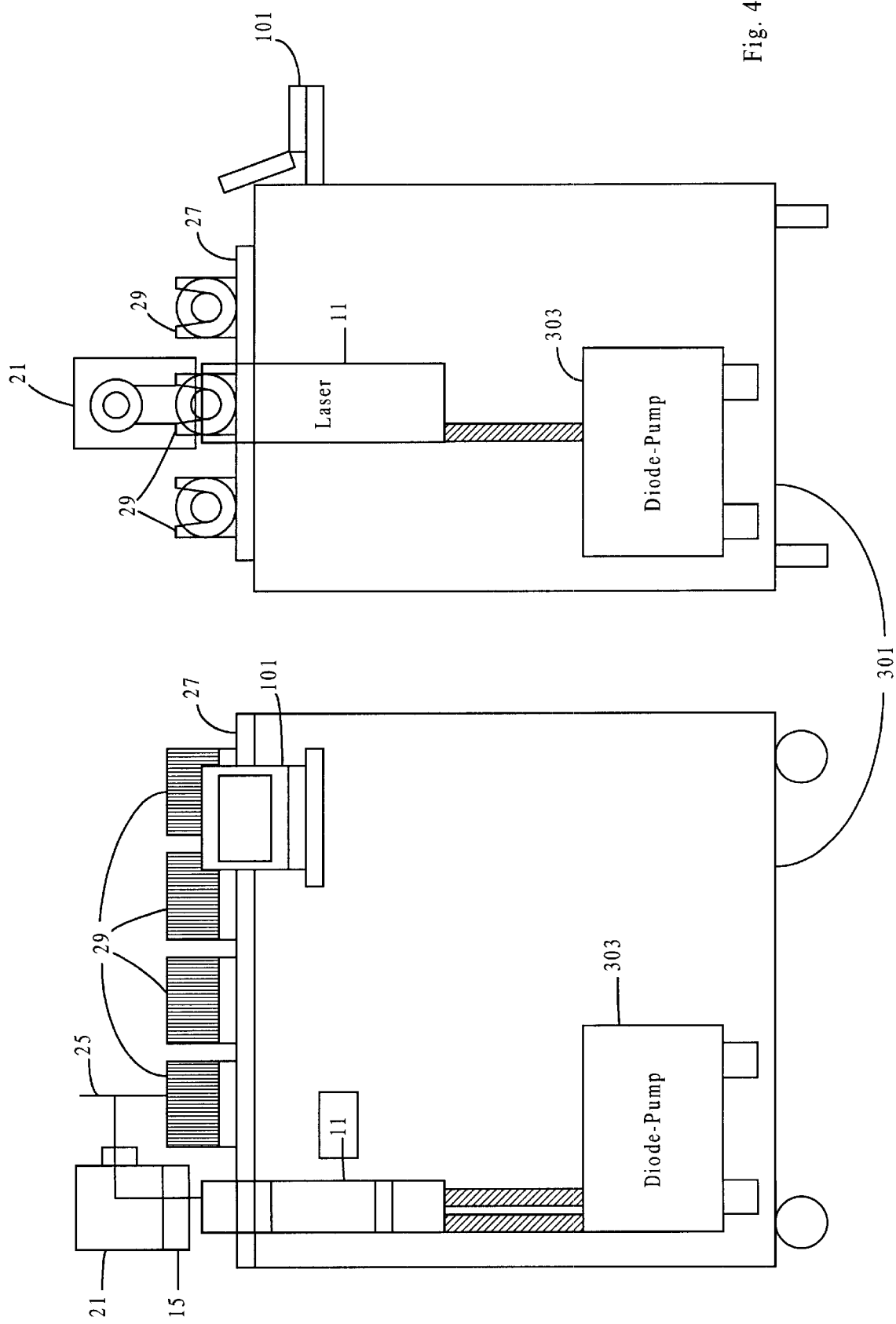
FIG. 4 shows the front and side views of the laser marking apparatus.

FIG. 4 depicts front and side views of a typical arrangement of the apparatus of the present invention. Cart 301 houses a diode pump 303 for laser 11. The beam from laser 11 passes through beam conditioning module 15 (not to scale) and a select beam passes to beam steering module 21, where it emerges as beam 23 directed to the workpiece 25. Workpiece 25 is positioned for marking by materials handling unit 27, which is controlled by processor 101, in this case, a laptop computer. The materials handling unit is capable of handling caddies or cassettes 29 of workpieces as part of a continuous operation.

Another aspect of the invention relates to marking a workpiece, and typically a multi-layered workpiece such as one which comprises a substrate, a first layer placed over said substrate, said first layer having a first melting point, one or more additional layers placed over said first layer, said additional layers having melting points higher than said first melting point, and a protective layer placed over said additional layer. The invention is especially suited to marking multi-layered workpieces such as magnetic storage media such as a computer hard disk, in which the first layer comprises nickel-phosphorous, the additional layers comprise a chromium layer and a magnetic layer, and the protective layer comprises carbon. The invention is particularly advantageous when applied to marking a finished computer hard disk, which typically comprises multiple layers on an aluminum substrate, as shown in FIG. 5.

Figure 5:
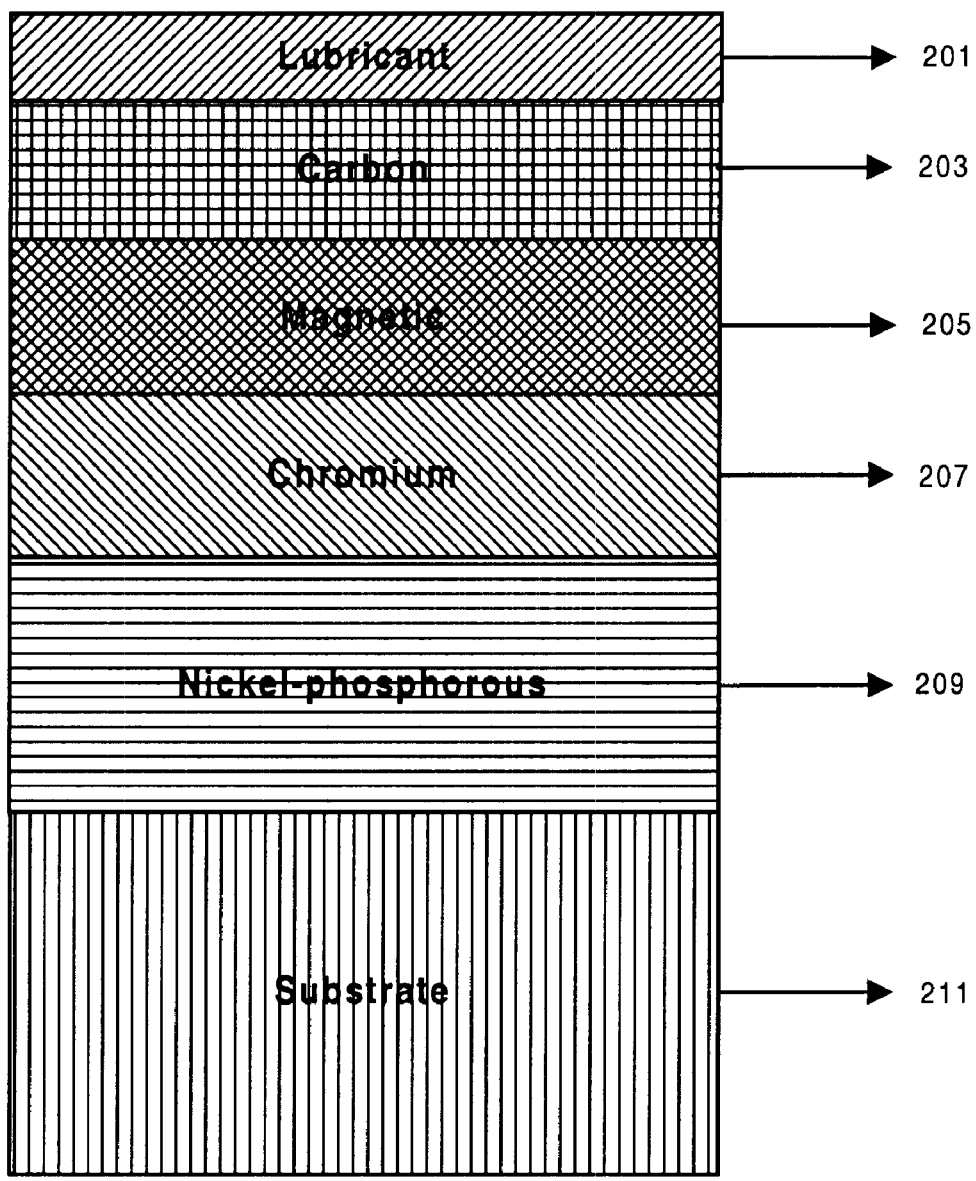
FIG. 5 is a typical cross section of a finished disk.

As shown in FIG. 5. the topmost layer 201 of such a disk is commonly an organic lubricant, a few nanometers thick. Below the lubricating layer 201 is a carbon layer 203 about 10 to 30 nanometers thick that serves as a protective coating for the magnetic layer 205 underneath. The magnetic layer 205 comprises mainly cobalt, with some chromium and small traces of platinum and/or tantalum, and is commonly 50 to 70 nanometers thick. Below the magnetic layer 205 is a chromium layer 207 which is typically 100 to 200 nanometers thick, followed by a nickel-phosphorus layer 209 which typically is about 10 micrometers thick, on a substrate 211 such as aluminum or other durable material.

A disk marked pursuant to the present invention will have visible surface deformations created by laser-induced rippling in the nickel phosphorous layer 209, while the integrity of the protective carbon layer 203 at the point of said deformation is substantially maintained. The laser will have a wavelength from 400 to 10,000 or more nanometers, a duration of 30 to 120 nanoseconds, and a pulse frequency of 1 to 100 kilohertz. In a preferred embodiment, the disk will have been marked by a laser having a wavelength of 1064 nanometers, a pulse length of about 50 nanoseconds, and the fluence of the beam at the surface of the workpiece is within the range of 0.5 to 1.5 joules /square centimeter, preferably 0.8 joule/sq. cm., in a laser spot size having a diameter from 10 to 30 micrometers, and preferably 15 micrometers.

Figure 6:
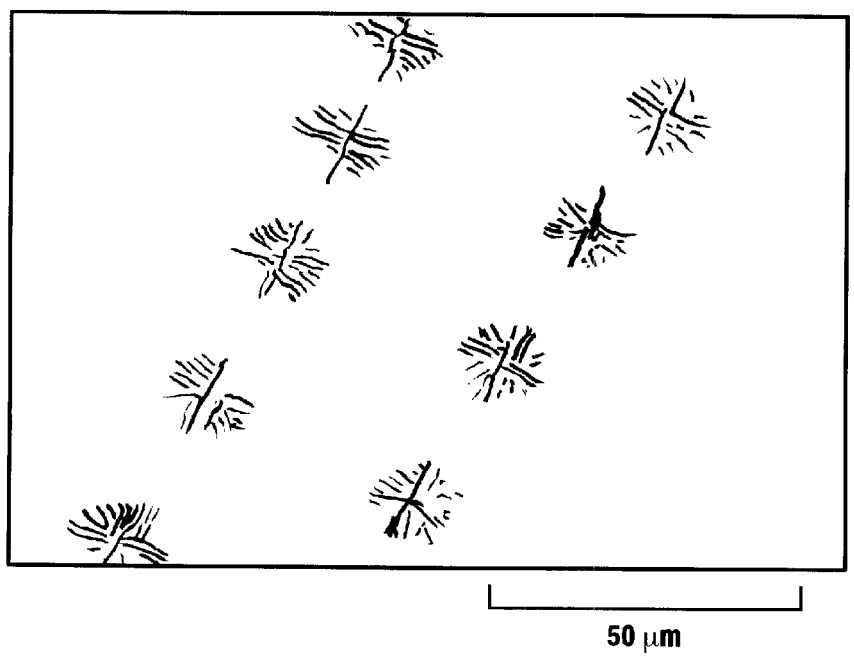
FIG. 6 is a scanning electron microscopy image of the laser marks formed on the disk surface by a scanning pulsed laser beam.

The laser can be either continuous wave, or pulsed. Preferably, the laser beam is made up of pulses, such that scanning the laser beam across the workpiece surface results in the formation of laser-induced dot-like marks along the line of scan, as shown in FIG. 6. A laser having a spot size of about 30 micrometers was used to form the marks shown in FIG. 6, and within each mark structure there are ripples which are more prominent than others.

Figure 7:
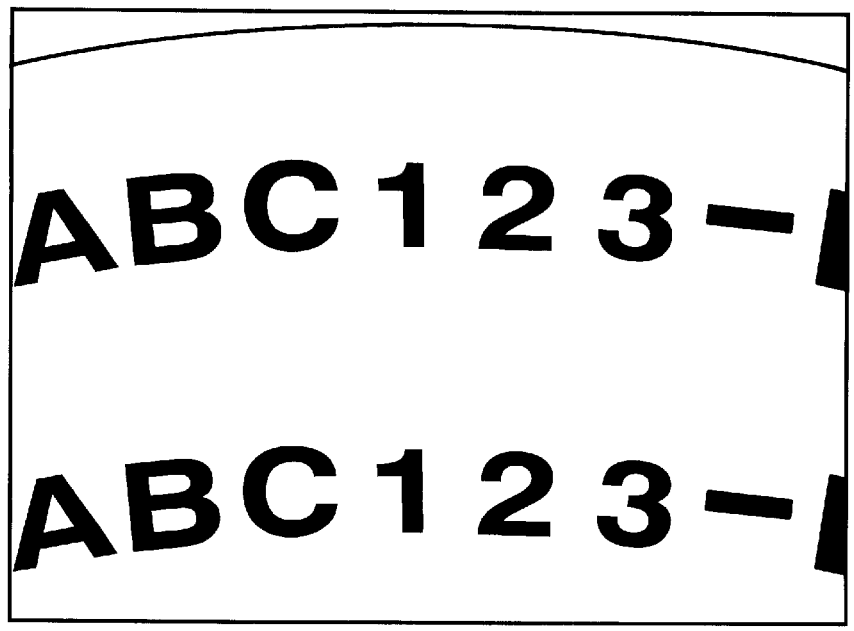
FIG. 7 shows characters formed on the hard disk surface using the laser marking system.

By scanning the laser along closely-spaced multiple lines, patterns of letters and numbers can be formed for labeling or marking purposes, as shown in FIG. 7. The spacing between two adjacent marks is determined by the laser Q-switch frequency and the beam scanning speed. This spacing will subsequently affect the visual contrast of the marked patterns on the workpiece surface. However, the scope of the present invention includes the use of a continuous laser, which will produce a continuous marking line on the surface of the workpiece.

Figure 8:
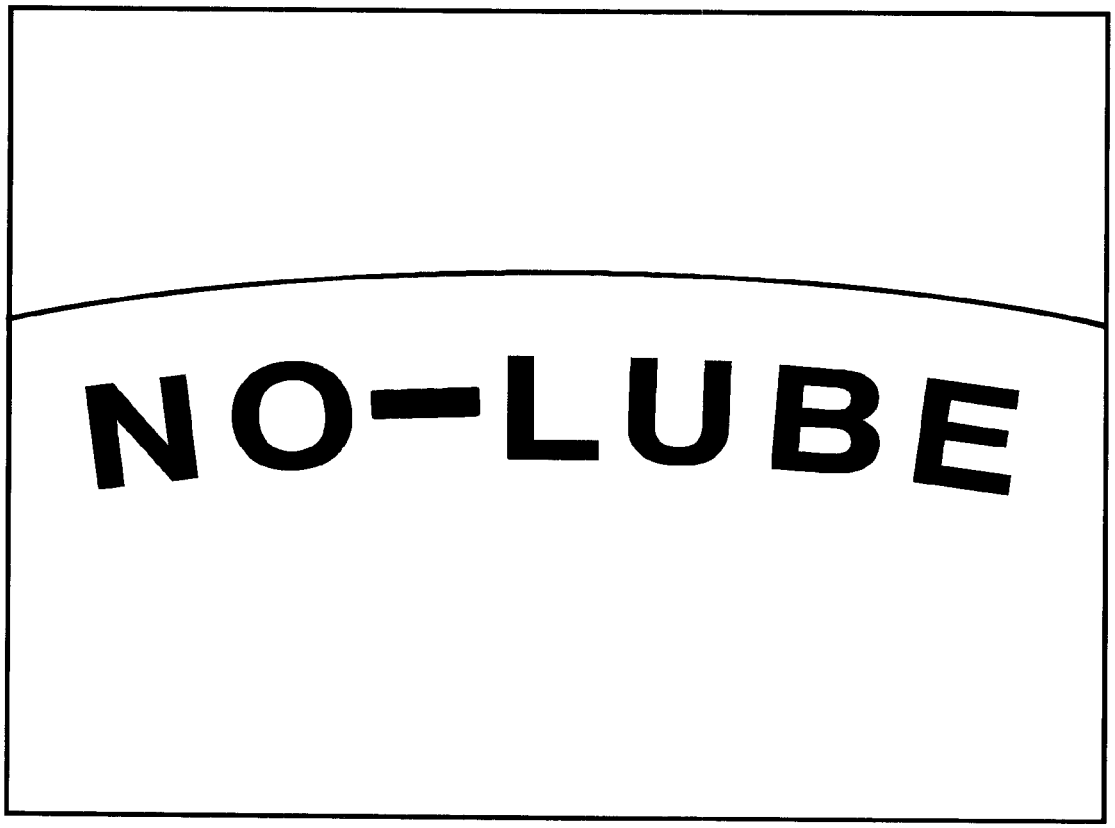
FIG. 8 depicts laser marking on a hard disk surface without a lubricating layer.

During a typical laser marking process, the topmost lubricating layer (201 on FIG. 5) at the spots where the intense laser pulses strike the workpiece surface would have been evaporated off. However, the visual contrast obtained by use of the present invention is not due to the loss of the lubricating layer. In FIG. 8, the desired visual contrast has been obtained on a workpiece where the lubricating layer is not originally present.

FIGS. 9 and 10 show a typical surface morphology, and related data profiles of cross-sections of atomic force microscopy images of the ripple structure formed during laser marking, FIG. 9 being marking formed in accord with the present invention, and FIG. 10 showing the results from use of a higher intensity beam which melts the protective coating. The laser fluence used was about 1 J/sq. cm for FIG. 9 and 2.7 J/sq. cm for FIG. 10. In both cases, a circular ripple structure was obtained. Such a structure is linked to the axial-symmetrical Gaussian-shaped intensity distribution of the laser beam. The ripple periodicity is around 1 to 2 micrometer. No micro-cracks were seen in the vicinity of the structure, and the magnitude of surface deformation around the rim of the ripple structure subsides gradually towards the non-irradiated region. Due to the smaller rippling structure formed, compared to that formed using a spot size of about 30 mcrometer (see e.g., FIG. 6), the outwardly radiating ripples are more uniform than when a larger spot size is used.

Figure 9A:
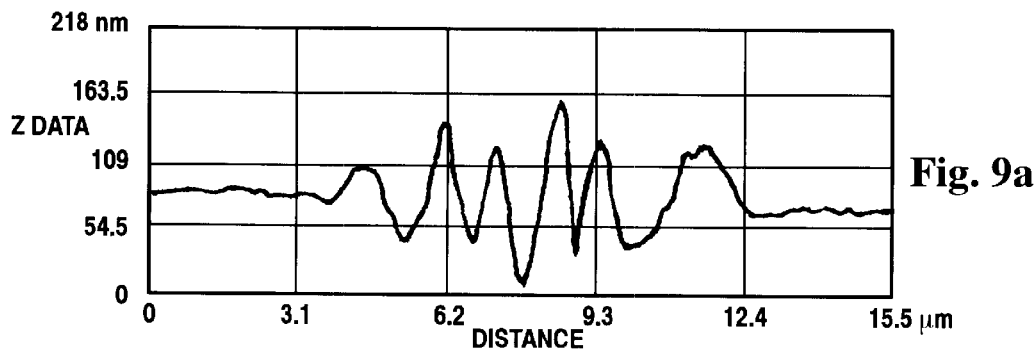
Figure 9B:
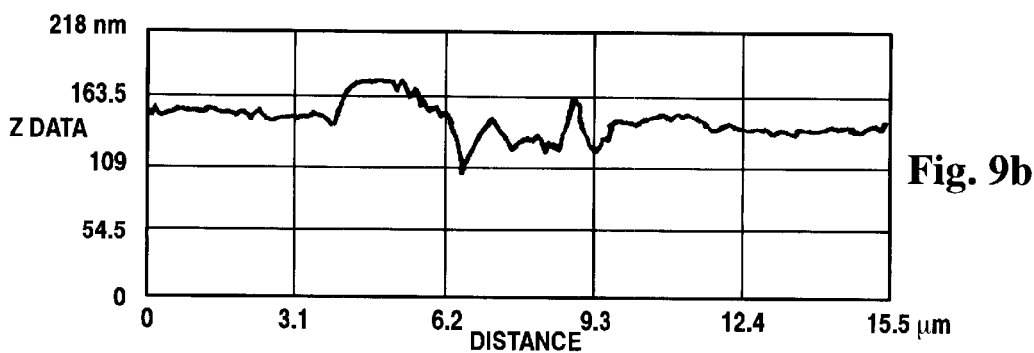
Figure 9C:
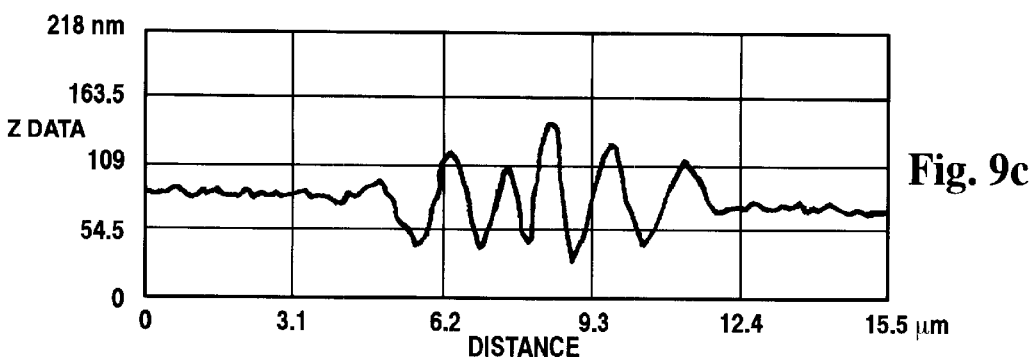

FIG. 9b is a data profile of a cross section taken along line b traversing the central portion of the ripple structure on FIG. 9. The lack of significant peaks or valleys in the profile indicates that the central region of the ripple structure is at about the same level as the surface of the workpiece. FIGS. 9a and 9c are data profiles of cross sections taken along lines a and c traversing the ripple structure depicted in FIG. 9 on either side of the central portion. The similar heights and depths of the peaks and valleys of the data profile indicates that the rippling occurs quite symmetrically about the surface level of the workpiece, demonstrating that the volume of the workpiece material was more or less conserved before and after laser irradiation.

Since the melting points of carbon—3800 K, cobalt—1768 K, platinum—2041 K, tantalum—3290 K and chromium—2130 K are all higher than that of the nickel-phosphorus—1200 K, the fluence of the laser was such that the laser only melted part of the nickel phosphorus layer while the upper two metallic layers and the carbon layer still remained reasonably solid. The interfacial stress exerted by the upper two metallic layers and the carbon layer acts as a restoring force controlling the movement of melted nickel phosphorus. Within a confined space, the volumetric change during rapid localized melting and subsequent re-solidification therefore brings about the rippling observed.

FIG. 10b is a data profile of a cross section taken along line b traversing the central portion of the ripple structure on FIG. 10. FIG. 10b shows a laser-induced structure with a different surface morphology from FIG. 9b. The structure of FIG. 10b has a raised circular central region surrounded by an annular rippling region. The data profiles of cross sections of the ripples are depicted in FIGS. 10a and 10c, representing cross sections taken along lines a and c traversing either side of the central portion of the ripple structure depicted in FIG. 10.

FIG. 11a is an auger electron spectroscopy depth profiling performed on the center of the ripple structure of FIG. 9, and FIG. 11b is an auger electron spectroscopy depth profiling performed on a non-irradiated region on the same disk specimen. On the left axis of FIG. 11a, it can be seen that the concentration of carbon nearest the surface (at the least depth) of a ripple approximates 100%, similar as what is shown in FIG. 11b for the concentration of carbon nearest the surface of a non-irradiated region of the same disk. Thus, auger electron spectroscopy depth profiling performed on the center of the structure in FIG. 9, when compared to profiling performed on a non-irradiated region on the same specimen, indicates that the carbon layer has remained very much intact, and that the interfaces between the metallic layers are well preserved.

Referring now to FIG. 12, there is depicted an atomic force microscopy image of a mark made on a hard disk using a laser fluence above that of the present invention, and three locations are marked on the surface, namely, a the center of the circular region, b the rippling region and c a non-irradiated region. Auger electron spectroscopy was performed on the surface at these locations and the results are shown in FIG. 13. The plot of the results indicates that at locations b and c, the surface layer contains only carbon, whereas at the surface at point a contains a mixture of carbon, chromium, and cobalt. Thus, at the circular central region of a mark formed using a laser fluence higher than that taught in the art, one or more of the upper metallic layers have melted together with the nickel-phosphorus layer, resulting in severe mass diffusion and material mixing. Due to the fact that the different layers have either been melted together or inter-diffused into one another, no surface rippling was obtained. The interfaces between different layers are almost no longer distinguishable. As the carbon layer, serving as a protective layer for the disk, has already been mixed with other materials, such a laser-induced deformation can lead to potential disk failures.

On the other hand, auger electron spectroscopy data profiles of scans taken at various depths of the central portion of the ripple structure of FIG. 9 are shown in FIG. 14. The auger electron spectroscopy was carried out repeatedly after every 5 minutes of sputter etching, and the spectrum at the respective depth was plotted. The first spectrum at the bottom corresponds to the surface level, while the topmost spectrum corresponds to a depth obtained after 95 minutes of sputter etching. The peak for carbon at the lowermost profiles remains well differentiated from the peaks for cobalt. Similarly, the peaks for cobalt remain well differentiated from the peak for chromium in the profiles at the corresponding depth. Subsequent profiles show that there is some interdiffusion of the chromium and nickel-phosphorous interfaces. Thus, the laser-induced deformation carried out according to the teachings of the present invention have been limited to formation of surface rippling required in the marking process, while leaving the protective upper layer substantially intact and functional.

While the invention has been particularly shown and described with reference to certain preferred embodiments, it will be understood by those skilled in the art that various alterations and modifications in form and detail may be made therein. Accordingly, it is intended that the following claims cover all such alterations and modifications as they fall within the true spirit and scope of the invention.

What is claimed is:

1. A laser apparatus for marking visible surface deformations on the surface of a multi-layered hard disk including an upper carbon layer, at least one intermediate metallic layer, and a lower metallic substrate, comprising:
   (a) a laser generator for generating an unconditioned output laser beam;
   (b) a beam conditioner responsive to said output laser beam including (i) a beam expander operative to generate an expanded laser beam and (ii) a beam collimator for collimating said beam;
   (c) a variable beam attenuator responsive to said expanded collimated beam and operative to generate a collimated conditioned marking beam;
   (d) a beam sampler in the path of said conditioned marking beam;

(e) a beam steerer in the path of said marking beam for directing and focusing said marking beam onto a surface of said multi-layered hard disk and for melting one of said at least one intermediate metallic layers and creating visible markings in said upper carbon layer without removing carbon or metal; and (f) a materials handler for positioning hard disks in the path of said marking beam.

2. A laser apparatus as recited in claim 1 wherein said variable beam attenuator includes a first optical plate responsive to said expanded laser beam and operative to generate said conditioned laser beam; and a beam splitter responsive to said conditioned laser beam and operative to split said conditioned laser beam into a plurality of beams including said marking beams.

3. A laser apparatus as recited in claim 2 wherein said first optical plate is rotatable along an axis parallel to that of said laser beam and operative to vary the fluence of said marking beam striking said hard disk.

4. A laser apparatus as recited in claim 2 wherein said first optical plate is a half-wave plate.

5. A laser apparatus as recited in claim 1 wherein said beam sampler further comprises a beam detector, said beam sampler being positioned in the path of said marking beam and capable of passing a sample of said marking beam to said detector, said beam detector being capable of receiving said sample and generating a signal responsive to the fluence of said marking beam.

6. A laser apparatus as recited in claim 1 wherein said variable beam attenuator includes a beam splitter, and wherein said apparatus further comprises an optical isolator for optically isolating the laser generator from any reflection of said marking beam to said laser generator, said optical isolator including a second optical plate positioned in the path of said marking beam, whereby the polarization plane of any reflection of the marking beam is rotated such that the reflection exits the beam splitter in a direction away from said laser beam generator.

7. A laser apparatus as recited in claim 1 wherein said beam steerer comprises a galvanometer for directing said marking beam.

8. A laser apparatus as recited in claim 1 wherein said laser generator includes a Q-switched diode-pumped laser.

9. A laser apparatus as recited in claim 1 further comprising a processor capable of receiving one or more signals responsive to one or more of variables from the group consisting of the status of said laser generator, the pattern of marks to be placed on said hard disk, the direction of said selected beam leaving said beam steerer, and the position of the hard disk relative to the beam steerer, said processor being capable of generating one or more signals affecting the status of said laser generator, the desired pattern of marks to be made on the surface of said hard disk the direction of the beam leaving the beam steerer, or the position of the hard disk be marked.

10. A laser apparatus as recited in claim 1 wherein said laser generator is operated in a pre-lasing mode.

11. A laser apparatus as recited in claim 1 wherein said marking beam is scanned across a portion of the surface of said hard disk to form surface deformations therein in a predetermined pattern.

12. A laser apparatus as recited in claim 11 wherein the resolution of said pattern is determined by varying the size of the beam from said beam conditioner.

13. A laser apparatus as recited in claim 11 wherein said laser beam is in pulses, and the contrast of said pattern is varied by changing one or more of the group consisting of pulse energy, pulse frequency and laser beam scanning speed.

14. A laser apparatus for writing visible surface deformations on a top surface of a multi-layered hard disk having a top layer and a plurality of intermediate metallic layers and a supporting substrate layer, comprising:

(a) one of said plurality of intermediate metallic layers having a lower melting temperature than the layer above it comprising a sublayer to be melted;

(b) a laser generator for generating a laser beam;

(c) a laser beam expander, and (d) a laser beam colliminator for generating a collimated marking beam;

(e) an optical attenuator for controlling the energy level of said collimated marking beam;

(f) a beam sampler for diverting a sample of said collimated marking beam;

(g) a beam steerer coupled to receive said collimated marking beam and for writing and directing a marking beam onto said multi-layered hard disk for melting said sublayer to be melted and said sublayer creates visible ripples in the top layer of said multi-layered hard disk upon solidifying.

15. A laser apparatus as set forth in claim 14 wherein said multi-layered hard disk comprises a magnetic disk comprising a carbon top layer, a magnetic layer and intermediate metallic sublayer comprising nickel having a lower melting temperature than said top layer and said magnetic layer, and visible ripples formed in said top layer by melting said sublayer.

16. A laser apparatus as set forth in claim 14 which further includes control means coupled to said beam steerer and said beam sampler for controlling the intensity of said marking beam.

17. A laser apparatus as set forth in claim 16 wherein said control means is coupled to said laser beam expander for controlling the size of the collimated marking beam.

18. A laser apparatus as set forth in claim 14 wherein said upper layer comprises a lubricating layer on top of a carbon protective layer, and said marking beam evaporates said lubricating layer without contaminating said top layer.

19. A laser apparatus as set forth in claim 18 wherein visible ripples appear in said carbon layer without removing any carbon.

* * * * *